Jan. 31, 1956
F. E. BLOUNT
2,733,401
VOLTAGE REGULATING CIRCUIT
Filed May 6, 1952
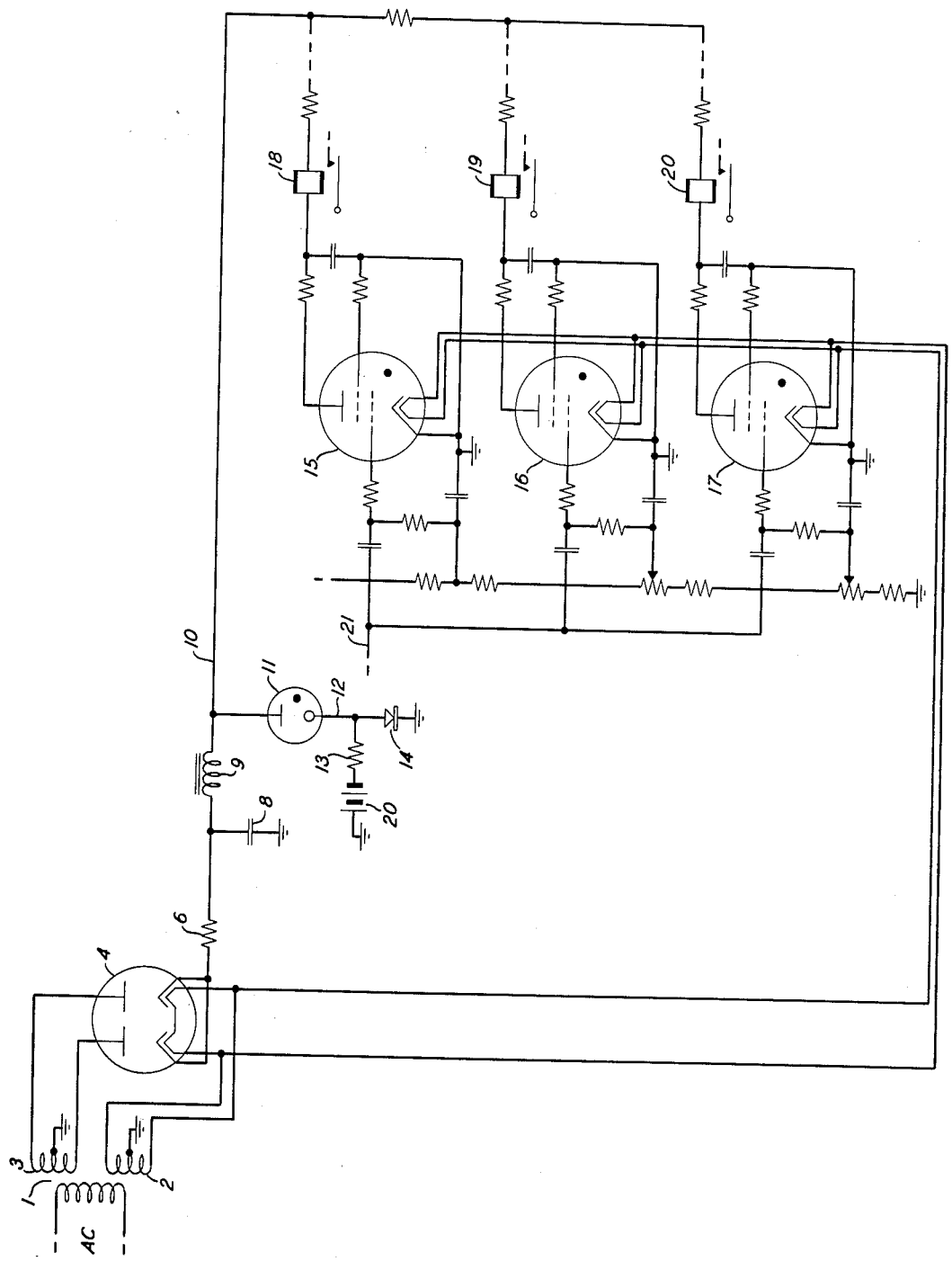
INVENTOR
F. E. BLOUNT
BY
C. Mattice
ATTORNEY United States Patent Office 2,733,401
Patented Jan. 31, 1956

2,733,401

VOLTAGE REGULATING CIRCUIT

Frank E. Blount, Cedar Grove, N. J., assignor to Bell Telephone Laboratories, Incorporated, New York, N. Y., a corporation of New York Application May 6, 1952, Serial No. 286,397

5 Claims. (Cl. 321—16)

This invention relates to voltage supply systems and has for its object to facilitate the maintenance of a constant voltage supply.

Where a direct-current voltage is derived from an alternating-current source, in order to maintain the direct-current voltage at a constant level, a gas-filled diode is frequently connected in parallel with the load. Such a diode, when conducting, has a very constant voltage characteristic and serves to hold the voltage applied to the load at a uniform level.

As is well known, the breakdown voltage of a diode is considerably higher than its sustaining voltage. Therefore, where the load is such that it creates intermittent current drains sufficient to extinguish the diode, it is desirable to supply auxiliary means for again causing the diode to conduct.

In accordance with the present invention, a biasing potential is supplied, which in combination with the normal load voltage, is sufficient to cause the diode to break down and become conducting, the biasing potential being rendered ineffective as soon as the diode becomes conducting by a shunt through a suitably poled unidirectional conductive device.

The invention will be more clearly understood from a consideration of the following description in connection with the drawing which shows the invention as applied to a line insulation testing system. Such a system is shown in the concurrently filed application of R. C. Avery, Serial No. 286,266 filed May 6, 1952, which issued as Patent 2,721,910 on October 15, 1955.

When the line insulation test circuit is to be used, connection is established between the primary winding of transformer 1 and a commercial supply of alternating current in any suitable manner. The windings of transformer 1 are so designed that secondary winding 2 supplies power at approximately 6 volts to the heater elements of tubes 4, 15, 16 and 17 as well as of other tubes, not shown. Secondary winding 3 supplies power at approximately 280 volts to the input terminals of rectifier tube 4. The output of the rectifier tube is approximately +285 volts, the ripple in the output voltage being reduced to a low value by means of a network comprising resistance 6, condenser 8 and retard coil 9, which also reduces the potential applied to output conductor 10 to approximately +150 volts.

Conductor 10 is connected to one terminal of diode 11, the other terminal of which is connected over conductor 12 through the 20,000-ohm resistance 13 to the negative central office battery 20 of approximately −48 volts, and to ground through the varistor or rectifier 14. When the rectifier tube 4 is put into service, the positive potential applied to conductor 10 added to the negative potential on conductor 12 is sufficient to cause diode 11 to become conducting. When current flows through resistance 13, the potential on conductor 12 becomes positive with respect to ground.

Varistor 14 is so poled that it offers an exceedingly high resistance to the flow of current when conductor 12 is negative but offers a very low resistance to the flow of current when conductor 12 is positive. Therefore as soon as tube 11 becomes conducting, it has a low resistance path to ground, in shunt of the path through resistance 13 and the central office battery.

The load applied to conductor 10 comprises a plurality of detectors, including tubes 15, 16 and 17. Plate current for tubes 15, 16 and 17 is supplied from conductor 10 through individual relays 18, 19 and 20. Tubes 15, 16 and 17 are biased to respond to different signal strengths by means of a potentiometer arrangement.

When a faulty line is tested, a signal is applied to conductor 21, changing the potentials on the grids of tubes 15, 16 and 17 so that one or more of these tubes breaks down, causing a comparatively heavy current flow through one or more of the relays 18, 19 and 20. This current may be sufficient to reduce the potential on conductor 10 below the sustaining voltage of tube 11, in which case tube 11 is extinguished and current ceases to flow through varistor 14. The operation of one or more of relays 18, 19 and 20 causes an indication that a faulty line has been tested, and the relative degree of the fault.

After an interval, the test circuit causes the removal of the signal from conductor 21 and opens the circuits of relays 18, 19 and 20, so that current ceases to flow through tubes 15, 16 and 17 and the potential on conductor 10 returns to +150 volts. Central office battery 20 is now again effective to raise the potential across tube 11 to the breakdown voltage, so that tube 11 again becomes conducting and the circuit is ready to indicate another faulty line.

What is claimed is:

1. In a voltage supply system, including a source of alternating current and a rectifier having an input circuit and an output circuit, said input circuit connected to said source, a gas-filled diode connected across said output circuit, the voltage on said output circuit being less than the breakdown voltage of said diode, an auxiliary source of direct-current voltage connected in series with said diode to enable said diode to break down, and a unidirectional conductive device connected in parallel with said auxiliary source.

2. In a voltage supply system, including a source of alternating current and a rectifier having an input circuit and an output circuit, said input circuit connected to said source, a gas-filled diode connected across said output circuit, the voltage on said output circuit being less than the breakdown voltage of said diode, an auxiliary source of direct-current voltage connected in series with said diode to enable said diode to break down, and a unidirectional conductive device connected in parallel with said auxiliary source, said unidirectional conductive device poled to oppose said auxiliary source.

3. In a voltage supply system, including a source of alternating current and a rectifier having an input circuit and an output circuit, said rectifier producing a high positive potential in said output circuit, a gas-filled diode, said diode connected across said output circuit, the voltage on said output circuit being less than the breakdown voltage of said diode, an auxiliary source of negative direct-current voltage, means for connecting said negative voltage source in series with said diode, and a unidirectional conductive device connected in parallel with said auxiliary source, said unidirectional device poled to oppose said negative source.

4. In a voltage supply system, including a source of alternating current and a rectifier having an input circuit and an output circuit, said rectifier producing a high positive potential in said output circuit, a gas-filled diode connected across said output circuit, the voltage on said output circuit being less than the breakdown voltage of said diode, an auxiliary source of negative direct-current voltage, means for connecting said negative voltage source in series with said diode, and a unidirectional conductive device connected in parallel with said auxiliary source, said unidirectional device poled to shunt said negative source when said diode is conducting.

5. In a voltage supply system, including a source of alternating current and a rectifier having an input circuit and an output circuit, said rectifier producing a high positive potential in said output circuit, a gas-filled diode connected across said output circuit, the voltage on said output circuit being less than the breakdown voltage of said diode, an auxiliary source of negative direct-current voltage, means for connecting said negative voltage source in series with said diode, and a rectifier connected in parallel with said auxiliary source, said rectifier poled to be non-conductive to current from said negative source and conductive to current through said diode when said diode is conducting.

References Cited in the file of this patent

UNITED STATES PATENTS

| | | |
|---|---|---|
| 1,835,121 | Rentschler | Dec. 8, 1931 |
| 2,201,979 | Christie | May 28, 1940 |
| 2,207,259 | Koch | July 9, 1940 |
| 2,499,443 | Young | Mar. 7, 1950 |